United States Patent Office 2,813,881
Patented Nov. 19, 1957

2,813,881
9α-HALO-17α-METHYLANDROSTANE-3,11β,17β-TRIOL

Milton E. Herr, Kalamazoo, Mich., assignor to The Upjohn Company, Kalamazoo, Mich., a corporation of Michigan No Drawing. Application March 19, 1956, Serial No. 572,231

7 Claims. (Cl. 260—397.5)

This invention pertains to organic compounds of the androstane series and is more particularly concerned with novel 9α-halo-17α-methylandrostane-3,11β,17β-triols of the formula

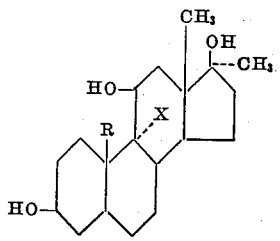

wherein R is selected from hydrogen and methyl and X is a halogen atom having an atomic weight from nineteen to 127, i. e. fluorine, chlorine, bromine, and iodine. Preferably X is a halogen atom having an atomic weight from nineteen to 36, i. e. fluorine and chlorine, fluorine being preferred. It is to be understood that the configuration of the 3-hydroxy group and the 5-hydrogen atom each can be α or β, and that compounds having both forms of the 3-hydroxy group and the 5-hydrogen atom are included within the scope of the present invention. This application is a continuation-in-part of copending application Serial No. 550,844, filed December 5, 1955, now abandoned.

It is an object of this invention to provide the 17α-methylandrostane-3,11β,17β-triols of the above formula. Said compounds are potent anabolic and androgenic agents and are used in place of prior anabolic and androgenic agents in known anabolic and androgenic pharmaceutical preparations. The compounds also have hypotensive, anti-pituitary, anti-estrogen, and central nervous system depressant activity, and are employed in place of known agents in pharmaceutical formulations used for such purposes. Other objects and uses will be apparent to one skilled in the art.

The 9α-halo-17α-methylandrostane-3,11β,17β-triols of the above formula are also useful in the form of their 17-monoacylate, 3,17-diacylate, 11,17-diacylate and 3,-11,17-triacylate. Their acylates, e. g., mono-, di-, or tri-acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 9α-halo-17α-methylandrostane-3,11β,17β-triols.

The 9α-halo-17α-methylandrostane-3,11β,17β-triols of the present invention can be prepared readily from the corresponding 9α-halo-11β,17β-dihydroxy-17α-methyl-androstane-3-ones (starting compounds are described in copending applications Serial No. 550,846, filed December 5, 1955, now abandoned and Serial No. 572,232, filed March 19, 1956) by hydrogenation of the 3-keto group to a 3-hydroxy group. The hydrogenation can be carried out by chemical reduction procedure, e. g., using a chemical reducing agent such as sodium borohydride, potassium borohydride, lithium aluminum hydride, or other dimetallic hydride, sodium and alcohol, etc. in a solvent which does not react readily with the reducing agent. The hydrogenation can also be carried out catalytically, e. g., employing hydrogen and a platinum catalyst employing an inert solvent such as ethyl alcohol. The 9α-halo-17α-alkylandrostane-3,11β,17β-triols and 9α-halo-17α-alkyl-19-norandrostane-3,11β,17β-triols wherein the alkyl radical is preferably a lower-alkyl radical containing from two to eight carbon atoms, inclusive, e. g. ethyl, propyl, isopropyl, butyl, secondary-butyl, amyl, hexyl, heptyl, octyl, etc., and wherein the halo atom is defined as above, are prepared by the same methods and have similar androgenic, hypotensive, anti-pituitary, central nervous system depressant, anti-estrogen, and anabolic activity.

The following examples are illustrative of certain preferred products and processes and are not to be construed as limiting.

Example 1.—A suspension of 9α-fluoro-11β,17β-dihydroxy-17α-methyl-5β-androstane-3-one in ethyl alcohol is stirred with a solution containing an excess of sodium borohydride in one-tenth normal aqueous sodium hydroxide. The starting steroid dissolves almost immediately and after ten minutes' stirring, the mixture is diluted with water and dilute aqueous acid is added to raise the pH of the mixture to pH 6. The product which precipitates is removed by filtration, washed with water, and dried in vacuo to provide 9α-fluoro-17α-methyl-5β-androstane-3α,11β,17β-triol. Recrystallization gave a melting point of 186–190 degrees centigrade (decomposes) and an $[\alpha]_D^{24}$ of plus 24 degrees in ethanol.

Anal.—Calcd. for $C_{20}H_{33}O_3F$: C, 70.54; H, 9.77; F, 5.58. Found: C, 70.85; H, 9.87; F, 5.70.

Example 2.—9α-fluoro-11β,17β-dihydroxy-17α-methyl-5α-androstane-3-one is converted to 9α-fluoro-17α-methyl-5α-androstane-3β,11β,17β-triol following the hydrogenation procedure of Example 1: A mixture of 0.5 gram of 9α-fluoro-11β,17β-dihydroxy-17α-methyl-5α-androstan-3-one and ten milliliters of 95 percent ethanol was treated with a solution of 250 milligrams of sodium borohydride in 2.5 milliliters of one-tenth normal aqueous sodium hydroxide and stirred at a temperature of about 25 degrees centigrade for ten minutes. The mixture was diluted with 25 milliliters of water and carefully neutralized with acetic acid. The 9α-fluoro-17α-methyl-5α-androstane-3β,11β,17β-triol which separated was recovered by filtration, washed with water and recrystallized from dilute acetone; yield 0.47 gram; melting point 260 degrees centigrade with decomposition; $[\alpha]_D^{24}$ plus seven degrees in ethanol.

Example 3.—Following the same hydrogenation procedure as shown in Examples 1 or 2, 9α-fluoro-11β,17β-dihydroxy-17α-methyl-19-nor-5α-androstane-3-one is converted to 9α-fluoro-17α-methyl-19-nor-5α-androstane-3β,11β,17β-triol and 9α-fluoro-11β,17β-dihydroxy-17α-methyl-19-nor-5β-androstane-3-one is converted to 9α-fluoro-17α-methyl-19-nor-5β-androstane-3α,11β,17β-triol. Also following the procedure of Examples 1 or 2, 9α-chloro-, 9α-bromo-, and 9α-iodo-11β,17β-dihydroxy-17α-methyl-5α(and 5β)-androstane-3-one are hydrogenated to provide 9α-chloro-, 9α-bromo-, and 9α-iodo-17α-methyl-5α(and 5β)-androstane-3β(and 3α),11β,17β-triol and 9α-chloro-, 9α-bromo-, and 9α-iodo-11β,17β-dihydroxy-17α-methyl-19-nor-5α(and 5β)-androstane-3-one are hydrogenated to provide 9α-chloro-, 9α-bromo-, and 9α-iodo-17α-methyl- 19-nor-5α(and 5β)-androstane-3β(and 3α),11β,17β-triol. Other 9α-halo-17α-alkyl-5α(and 5β)-androstane-3β(and 3α),11β,17β-triols and 9α-halo-17α-alkyl-19-nor-5α(and 5β)-androstane-3β(and 3α),11β,17β-triols, wherein the alkyl radical and halo atom are defined and illustrated above, are prepared by the same procedure from corresponding 9α-halo-11β,17β-dihydroxy-17α-alkyl-5α-(and 5β)-androstane-3-ones and 9α-halo-11β,17β-dihydroxy-17α-alkyl-19-nor-5α(and 5β)-androstane-3-ones.

Example 4.—A solution of 9α-fluoro-methyl-5α-androstane-3β,11β,17β-triol in dry pyridine is treated with acetic anhydride, the molar ratio of steroid to acetic anhydride being about two to four and the resulting mixture is heated under reflux for about five hours. The mixture is then cooled, diluted with water while stirring, and the solid precipitate obtained removed by filtration. The solid is washed with two percent aqueous hydrochloric acid solution and with water, and then dried under vacuum. Recrystallization of chromatographic separation provides purified 9α-fluoro-17α-methyl-5α-androstane-3β,11β,17β-triol 3,17-diacetate. In exactly the same manner 9α-fluoro-17α-methyl-5β-androstane-3α,11β,17β-triol 3,17-diacetate, 9α-fluoro-17α-methyl-19-nor-5α-androstane-3β,11β,17β-triol 3,17-diacetate and 9α-fluoro-17α-methyl-19-nor-5β-androstane-3α,11β,17β-triol, 3,17-diacetate are obtained by using 9α-fluoro-17α-methyl-5β-androstane-3α,11β,17β-triol, 9α-fluoro-17α-methyl-19-nor-5α-androstane-3β,11β,17β-triol and 9α-fluoro-17α-methyl-19-nor-5β-androstane-3α,11β,17β-triol, respectively, as the starting steroid in the foregoing procedure. Substituting the appropriate acylating agent, i. e., the appropriate acid, acid anhydride or acid chloride, for the acetic anhydride in the above process provides other 3,17-diacylates of 9α-fluoro-17α-methyl-5α(and 5β)-androstane-3β(and 3α),11β,17β-triol and 9α-fluoro-17α-methyl-19-nor-5α(and 5β)-androstane-3β(and 3α),11β,17β-triol including the 3,17-diformate, dipropionate, di-(trimethylacetate), difuroate, di-(α or β-cyclohexylpropionate), dibenzoate, di-(phenylacetate), di-(α or β-cyclopentylpropionate), di-(α or β-phenylpropionate), di-(methylbenzoate), di-(α or β-furylacrylate), divalerate, dimethacrylate, and the like. By following the foregoing acylation procedure 3,17-diacylates having acylate radicals as defined and illustrated above, are prepared from 9α-chloro-, 9α-bromo-, and 9α-iodo-17α-methyl-5α(and 5β)-androstane-3β(and 3α),11β,17β-triol and 9α-chloro-, 9α-bromo-, and 9α-iodo-17α-methyl-19-nor-5α-(and 5β)-androstane-3β(and 3α),11β,17β-triol.

Example 5.—A mixture of 9α-fluoro-17α-methyl-5α-androstane-3β,11β,17β-triol 3,17-diacetate, a large excess of acetic anhydride to serve as both acylating agent and solvent, and a trace of the strongly acidic catalyst sulfuric acid is heated at a temperature of about one hundred degrees centigrade for twelve hours. The hot solution then is poured over cracked ice and the resulting mixture stirred until hydrolysis of the excess acetic anhydride is complete. The solid product which precipitates is removed by filtration, washed with water and dried under vacuum. Purified 9α-fluoro-17α-methyl-5α-androstane-3β,11β,17β-triol 3,11,17-triacetate is obtained by recrystallization of chromatographic separation. 9α-fluoro-17α-methyl-5β-androstane-3α,11β,17β-triol 3,11,17-triacetate is obtained in exactly the same manner by substituting 9α-fluoro-17α-methyl-5β-androstane-3α,11β,17β-triol for the above starting steroid. By substituting the appropriate acylating agent, i. e., the appropriate acid anhydride or isopropenyl acylate, in the above procedure other 3,11,17-triacylates of 9α-fluoro-, 9α-chloro-, 9α-bromo-, and 9α-iodo-17α-methyl-5α(and 5β)-androstane-3β(and 3α),11β,17β-triol and 9α-fluoro-, 9α-chloro-, 9α-bromo-, and 9α-iodo-17α-methyl-19-nor-5α(and 5β)-androstane-3β(and 3α),11β,17β-triol are obtained including the 3,11,17-tripropionate, triacetate, tri-(trimethylacetate), trifuorate, tri-(α or β-cyclohexylpropionate), tribenzoate, tri-(phenylacetate), tri-(α or β-cyclopentylpropionate), tri-(α or β-phenylpropionate), tri-methylbenzoates), tri-(α or β-furylacrylates), trivalerate, tri-(methacrylate), 11-acetate 3,17-diformate, 11-(β-cyclopentylpropionate) 3,17-diacetate, and the like. The foregoing 3,17-diacylates and 3,11,17-triacylates, and also 17-monoacylates and 11,17-diacylates as well as other 3,17-diacylates and other 3,11,17-triacylates, can be prepared by hydrogenation, according to the process of the present invention, of corresponding 17-acylates and 11,17-diacylates of 9α-fluoro-, 9α-chloro-, 9α-bromo-, and 9α-iodo-11β,17β-dihydroxy-17α-methyl-5α(and 5β)-androstane-3-one and 9α-fluoro-, 9α-chloro-, 9α-bromo-, and 9α-iodo - 11β,17β-dihydroxy-17α-methyl-19-nor-5α-(and 5β)-androstane-3-one, followed by acylation according to the procedure of Examples 4 and/or 5, when applicable, to obtain the desired acylated product. The 17-monoacylates, 3,17-diacylates, 11,17-diacylates and 3,11,17 - triacylates of other 9α-halo-17α-alkyl-5α(and 5β)-androstane-3β(and 3α),11β,17β-triols and 9α-halo-17α - alkyl-19-nor-5α(and 5β)-androstane-3β(and 3α),-11β,17β-triols, wherein the alkyl and acylate radicals and the halo atom are as defined and illustrated above, also are prepared by the foregoing procedures.

I claim:
1. 9α - halo - 17α-methylandrostane-3,11β,17β-triol of the formula

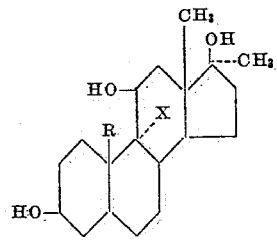

wherein R is selected from hydrogen and methyl and X is a halogen atom having an atomic weight from nineteen to 127.

2. 9α - halo - 17α - methylandrostane - 3,11β,17β-triol wherein the halo atom has an atomic weight from nineteen to 36.

3. 9α - halo - 17α - methyl - 19 - norandrostane - 3,-11β,17β-triol wherein the halo atom has an atomic weight from nineteen to 36.

4. 9α - fluoro - 17α - methyl - 5α - androstane - 3β,-11β,17β-triol.

5. 9α - fluoro - 17α - methyl - 5β - androstane - 3α,-11β,17β-triol.

6. 9α - fluoro - 17α - methyl - 19 - nor - 5α - androstane-3β,11β,17β-triol.

7. 9α - fluoro - 17α - methyl - 19 - nor - 5β - androstane-3α,11β,17β-triol.

No references cited.